(12) United States Patent
Guo et al.

(10) Patent No.: US 9,477,119 B2
(45) Date of Patent: Oct. 25, 2016

(54) ARRAY SUBSTRATE AND LIQUID CRYSTAL DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yuanhui Guo, Beijing (CN); Feng Qin, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 60 days.

(21) Appl. No.: 14/419,595

(22) PCT Filed: Jul. 4, 2014

(86) PCT No.: PCT/CN2014/081647
§ 371 (c)(1),
(2) Date: Feb. 4, 2015

(87) PCT Pub. No.: WO2015/043277
PCT Pub. Date: Apr. 2, 2015

(65) Prior Publication Data
US 2016/0033826 A1    Feb. 4, 2016

(30) Foreign Application Priority Data
Sep. 27, 2013   (CN) .......................... 2013 1 0450998

(51) Int. Cl.
G02F 1/1343    (2006.01)
G02F 1/1337    (2006.01)
G02F 1/1362    (2006.01)

(52) U.S. Cl.
CPC ... *G02F 1/134309* (2013.01); *G02F 1/133784* (2013.01); *G02F 1/136286* (2013.01); *G02F 2001/134372* (2013.01)

(58) Field of Classification Search
CPC .................. G02F 1/134309; G02F 1/136286; G02F 1/133874
USPC ........................................ 349/144, 142, 126
See application file for complete search history.

(56) References Cited

U.S. PATENT DOCUMENTS

2009/0185123 A1    7/2009 Morimoto et al.

FOREIGN PATENT DOCUMENTS

CN    102073169 A    5/2011
CN    202351591 U    7/2012

(Continued)

OTHER PUBLICATIONS

Office Action in Chinese Patent Application No. 201310450998.0, dated Jul. 1, 2015.

(Continued)

*Primary Examiner* — Joseph L Williams
(74) *Attorney, Agent, or Firm* — BakerHostetler LLP

(57) ABSTRACT

The array substrate according to the present disclosure may include gate lines, data lines, pixel units defined by the gate lines and the data lines, and an alignment film formed above the pixel units. The gate lines may extend in a horizontal direction, and a rubbing direction of the alignment film may be angled relative to a longitudinal direction at a first non-zero angle β.

18 Claims, 3 Drawing Sheets

(56) References Cited

FOREIGN PATENT DOCUMENTS

| CN | 202351592 U | 7/2012 |
|---|---|---|
| CN | 102629045 A | 8/2012 |
| CN | 102629056 A | 8/2012 |
| CN | 102629058 A | 8/2012 |
| CN | 102736339 A | 10/2012 |
| CN | 103488011 A | 1/2014 |
| CN | 203444213 U | 2/2014 |
| JP | 2009-250991 A | 10/2009 |

OTHER PUBLICATIONS

International Search Report and Written Opinion in PCT International Application No. PCT/CN2014/081647, dated Oct. 10, 2014.

ARRAY SUBSTRATE AND LIQUID CRYSTAL DISPLAY DEVICE

CROSS-REFERENCE TO RELATED APPLICATION

This application is the U.S. national phase of PCT Application No. PCT/CN2014/081647 filed on Jul. 4, 2014, which claims priority to Chinese Patent Application No. 201310450998.0 filed on Sep. 27, 2013, the disclosures of which are incorporated in their entirety by reference herein.

TECHNICAL FIELD

The present disclosure relates to the field of liquid crystal display technology, in particular to an array substrate and a liquid crystal display device.

BACKGROUND

Along with the development of manufacturing technologies, a thin film transistor liquid crystal display (TFT-LCD) has replaced a traditional Cathode Ray Tube (CRT) display device as a mainstream of display devices due to its advantages such as low power consumption, low cost and free of radiation. A display panel of the TFT-LCD consists of an array substrate and a color filter substrate arranged opposite to each other to form a cell, and liquid crystal molecules are arranged between the array substrate and the color filter substrate. The array substrate includes gate lines and data lines arranged in a crisscross manner, pixel units defined by the gate lines and the data lines, and an alignment film formed above the pixel units. Each pixel unit includes a thin film transistor (TFT), a pixel electrode and a common electrode. The TFT, as a switch element, is configured to generate a driving electric field between the pixel electrode and the common electrode, thereby to control the deflection of the liquid crystal molecules and display an image. A polyimide (PI) material is deposited after the formation of the pixel units, so as to form the alignment layer. Then, the alignment film is subjected to rubbing alignment, so as to form an alignment direction of the liquid crystal molecules.

Referring to FIG. 1, gate lines 10' are defined as being distributed horizontally, and data lines 20' are distributed longitudinally. Pixel units 1' are defined by the gate lines 10' and the data lines 20' and each includes a pixel electrode 2' having a slit 3'. A simulation on an angle $0°\leq\beta\leq8°$ between the alignment direction (shown by a solid line L' in FIG. 1) of the liquid crystal molecules and a longitudinal direction was carried out by the inventors by using a software called "TechWiz", and a corresponding response time was obtained. According to a simulation result, when $\beta=7°$, the response time of the display device will be increased, e.g., by 20%, relative to the response time when $\beta=0°$. When $\beta=8°$, the response time will be increased by 30% relative to the response time when $\beta=0°$, and a contrast of the display device will be reduced by 50% relative to that the contrast when $\beta=0°$, i.e., a rubbing direction of the alignment film is perpendicular to the gate lines 10'. However, if the rubbing direction of the alignment film is perpendicular to the gate line 10', a very large resistance will occur when the alignment film is subject to the rubbing alignment. As a result, a service life of the alignment film and rubbing evenness will be adversely affected, and thereby poor display grayscales will occur.

SUMMARY

An object of the present disclosure is to provide an array substrate and a liquid crystal display device, so as to prevent the occurrence of poor rubbing of an alignment film when a rubbing direction of the alignment film is perpendicular to gate lines.

In one aspect, the present disclosure provides an array substrate including gate lines, data lines, pixel units defined by the gate lines and data lines, and an alignment film formed above the pixel units. The gate lines may extend in a horizontal direction, and a rubbing direction of the alignment film may be angled relative to a longitudinal direction at a first non-zero angle $\beta$.

In another aspect, the present disclosure provides a liquid crystal display device including the above-mentioned array substrate.

The present disclosure has the following advantageous effect. According to the present disclosure, the rubbing direction of the alignment film is arranged as not to perpendicular to the gate lines, and as a result, it is able to reduce a resistance occurring when the alignment film is subject to rubbing alignment, thereby to reduce the occurrence of poor rubbing.

BRIEF DESCRIPTION OF THE DRAWINGS

In order to illustrate the technical solutions of the present disclosure or the prior art in a clearer manner, the present disclosure or the prior art will be described briefly hereinafter in conjunction with the drawings. Obviously, the following drawings merely relate some of the embodiments of the present disclosure, and based on these drawings, a person skilled in the art may obtain the other drawings without any creative effort.

DETAILED DESCRIPTION

The present disclosure will be described hereinafter in conjunction with the drawings and the embodiments. The following embodiments are for illustrative purposes only, shall not be used to limit the scope of the present disclosure.

First Embodiment

Figure 3:
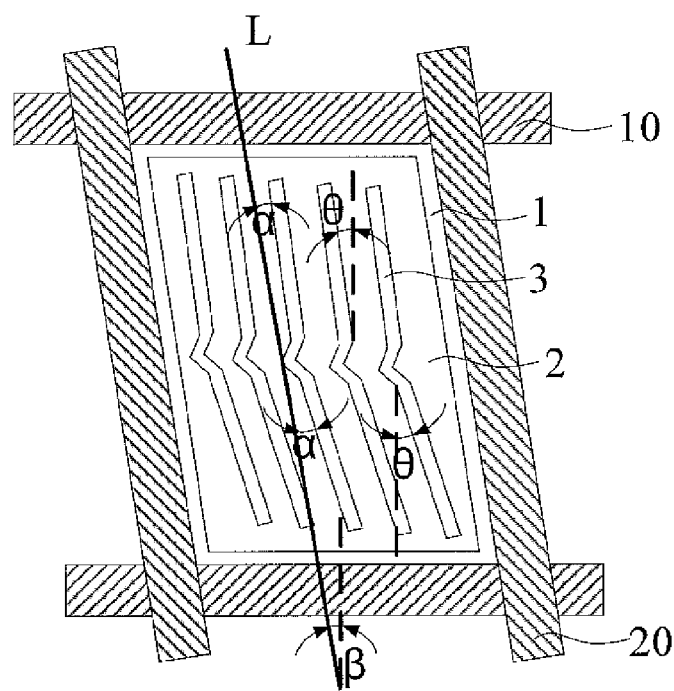
FIG. 3 is a schematic view showing an array substrate according to one embodiment of the present disclosure.
Figure 4:
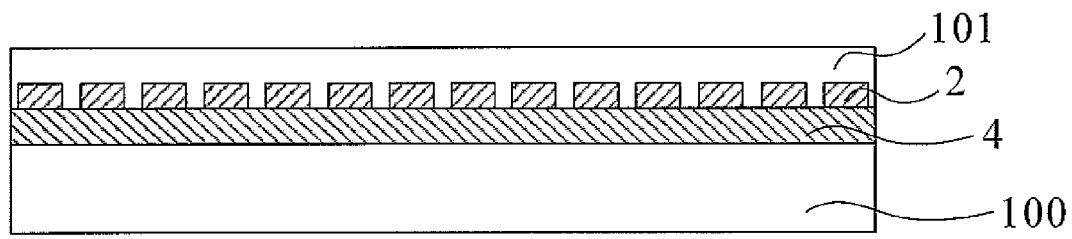
FIG. 4 is a schematic view showing a pixel unit according to one embodiment of the present disclosure.

Referring to FIGS. 3 and 4, an array substrate of this embodiment includes a base substrate 100, gate lines 10 and data lines 20 formed on the base substrate 100, and pixel units 1 defined by the gate lines 10 and the data lines 20. Each pixel unit 1 includes a Thin-film Transistor (TFT) (not shown) serving as a switch element, a common electrode 4 and a pixel electrode 2. A gate electrode of the TFT is connected to the gate line 10, a source electrode thereof is connected to the data line 20, and a drain electrode thereof is connected to the pixel electrode 2, so as to control generating an electric field for driving the deflection of liquid crystal molecules. An alignment film 101 is also formed above the pixel units 1, and an alignment direction of the liquid crystal molecules depends on a rubbing direction of the alignment film 101.

In order to facilitate the understanding, in this embodiment, the gate lines 10 are defined as extending in a horizontal direction, and the rubbing direction of the alignment film 101 (shown by a solid line L in FIG. 3) is angled relative to a longitudinal direction at a first non-zero angle $\beta$, i.e., the rubbing direction of the alignment film 101 is not perpendicular to a direction of the gate lines 10. As a result, it is able to reduce a resistance occurring when the alignment film 101 is subject to rubbing alignment, thereby to reduce the occurrence of poor rubbing.

Figure 6:
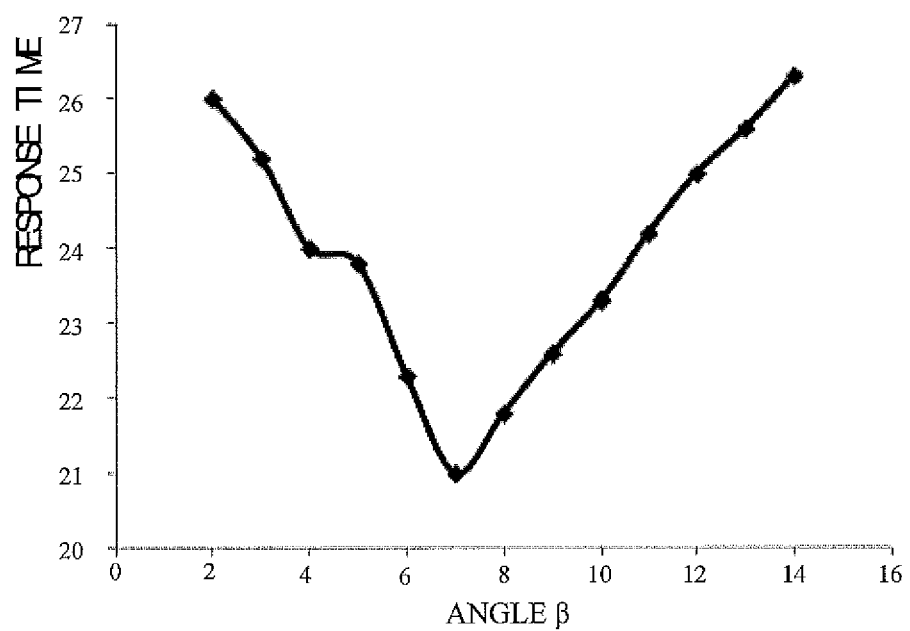
FIG. 6 is a schematic view showing the relationship between an angle $\beta$, at which the rubbing direction of the alignment film is offset from a direction perpendicular to a gate line, and a response time of a display device according to one embodiment of the present disclosure.

In this embodiment, preferably $\beta \geq 2°$, so as to effectively improve the poor rubbing when the alignment film is subject to the rubbing alignment. The bigger the angle $\beta$, the more apparent the improvement to the poor rubbing. However, an increase in the angle $\beta$ will lead to an increase in a response time of a liquid crystal display device and a decrease in a contrast thereof, and even a serious influence on the display quality of the display device. Hence, the angle $\beta$ may be set as $2° \leq \beta \leq 14°$, so as not to adversely affect normal display of the display device. Simulation on $2° \leq \beta \leq 14°$ was carried out by the inventors by using a software called "TechWiz", and the corresponding response time was obtained. As shown in FIG. 6, a simulation result shows that, when $\beta$ approaches $2°$ or $14°$, the response time of the display device will be increased, e.g., by 25% relative to the response time when $\beta=7°$, so $\beta$ is preferably set as $7°$. Because an optimal angle between the rubbing direction of the alignment film and the longitudinal direction is changed from $0°$ to $7°$, it is able to effectively prevent the occurrence of poor rubbing when the alignment film is subject to the rubbing alignment.

Further, an extension direction of the data line 20 is set to be parallel to the rubbing direction of the alignment film 101. Usually, the gate lines 10 and the data lines 20 are arranged on the array substrate in a crisscross manner, and when the rubbing direction of the alignment film 101 is not perpendicular to the gate lines 10, it is not parallel to the data lines 20 any longer, thereby a resistance will occur when the alignment film 101 is subject to the rubbing alignment. By setting the extension direction of the data lines 20 to be parallel to the rubbing direction of the alignment film 101, it is able to eliminate this resistance, thereby to overcome the poor rubbing caused when the rubbing direction of the alignment film 101 is not parallel to the data lines 20.

According to the present disclosure, the rubbing direction of the alignment film is not perpendicular to the gate line direction, and as a result, it is able to reduce the resistance occurring when the alignment film is subject to the rubbing alignment, thereby to prevent the occurrence of poor rubbing.

Second Embodiment

When the rubbing direction of the alignment film is set as not perpendicular to the gate line direction, the display of the display device will be affected to some extent, especially for a display device capable of providing a multi-domain liquid crystal operational mode.

ADSDS (ADvanced Super Dimension Switch, ADS for short) is a wide viewing angle core technique for a planar electrical field system, and its main features may be described as forming a multi-dimensional electric field by means of electrical fields generated at edges of slit electrodes within an identical plane and an electrical field generated between a slit electrode layer and a plate electrode layer, so as to enable all the liquid crystal molecules between the slit electrodes and right above the electrodes within a liquid crystal cell to rotate, thereby to improve the operational efficiency of the liquid crystal molecules and enhance the light transmission efficiency. ADS may be used to improve the image quality of a TFT-LCD product, and has such advantages as high resolution, high transmittance, low power consumption, wide viewing angle, high aperture ratio, low chromatic aberration and free of push Mura. For different applications, the improved techniques of ADS may include I-ADS (for high transmittance), H-ADS (for high aperture ratio) and S-ADS (for high resolution).

Figure 1:
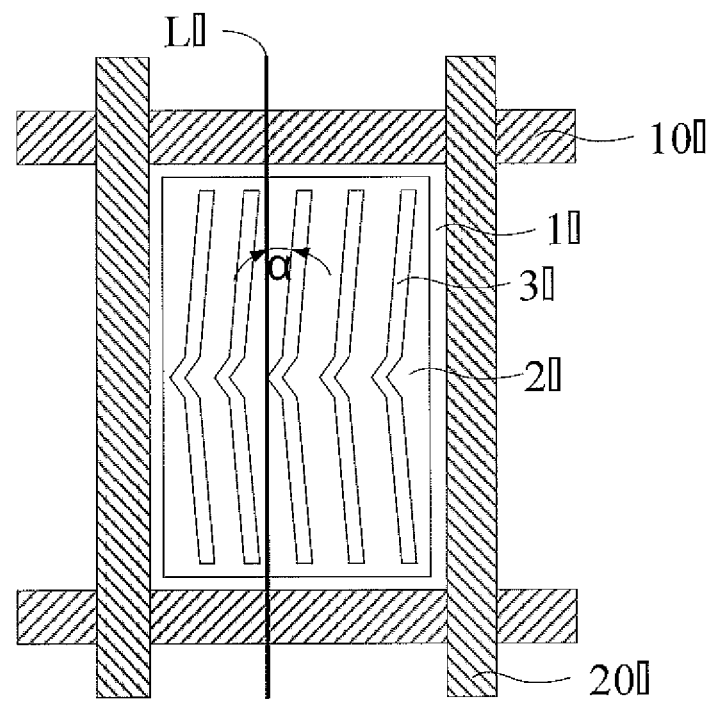
FIG. 1 is a schematic view showing a conventional array substrate.

To be specific, referring to FIG. 1, the pixel units 1' of a liquid crystal display device with an ADS mode each includes a first electrode (i.e., a common electrode) and a second electrode 2' (i.e., a pixel electrode) provided with a plurality of slits 3' (each slit 3' is of a stripe-like shape) and located above the first electrode. The slits 3' are provided with different extension directions, so as to form horizontal electric fields in several directions between the first electrode and the second electrode 2' through the slits 3', thereby to provide the multi-domain liquid crystal operational mode. The first electrode may be a plate-like electrode or an electrode provided with a plurality slits. The slits 3' of the second electrode 2' at least correspond to a position between two slits of the first electrode.

In this embodiment, the liquid crystal display device with the ADS mode is taken as an example so as to illustrate the influence on the display of the display device capable of providing the multi-domain liquid crystal operational mode when the rubbing direction of the alignment film is not perpendicular to the gate line direction.

Figure 2:
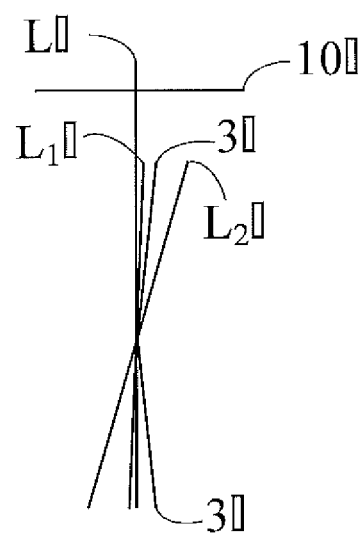
FIG. 2 is a schematic view showing the location relationship among a gate line direction, a slit extension direction of a second electrode, and a rubbing direction of an alignment film in a conventional display device with a multi-domain liquid crystal operational mode.

Referring to FIG. 1, for the ADS display device capable of providing a two-domain liquid crystal operational mode, when designing a pixel structure of the array substrate, the pixel electrodes 2' are arranged in a manner having a shape like "<" or ">", i.e., the slits 3' of the pixel electrodes 2' may extend in two different directions, so as to form horizontal driving electric fields in two directions, thereby to provide a two-domain liquid crystal operational mode. This pixel structure design is called as two-domain design. As compared with a one-domain (where the slits of the pixel electrode are of a straight stripe shape) design, the two-domain design has such advantages as a small chromatic deviation and a wide viewing angle. Referring to FIG. 2, during the application of the array substrate of the present disclosure to the ADS display device capable of providing the two-domain liquid crystal operational mode, the inventors find that, when the angle $\beta$ between the rubbing direction (shown by a solid line $L_2'$) of the alignment film and the longitudinal direction approaches or is greater than an angle $\theta$ between an extension direction of the slits 3' and the longitudinal direction, an angle $\alpha$ between the rubbing direction of the alignment film and the slits 3' thereabove will be too small, which results in confused deflection of the liquid crystal molecules and a large response time, and meanwhile an angle $\alpha$ between the rubbing direction of the alignment film and the slits 3' therebelow will be too large, which results in decreased contrast and transmittance of the display device. When the angle $\beta$ between the rubbing direction (shown by a solid line $L_1'$) and the longitudinal direction is less than the angle θ between the extension direction of the slits 3' and the longitudinal direction, the poor rubbing will not be improved significantly.

Obviously, for the liquid crystal display device with the ADS mode, when the slits of the pixel electrode extend in three or more directions so as to provide the multi-domain liquid crystal operational mode, the above defects will also occur.

Figure 5:
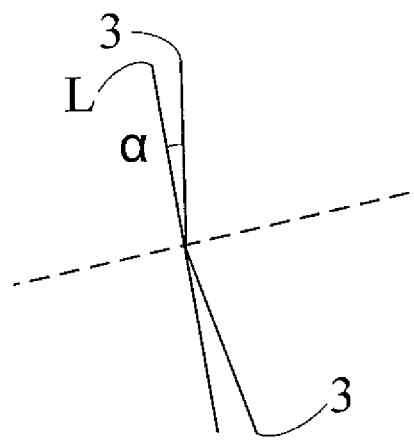
FIG. 5 is a schematic view showing the relationship between a slit extension direction of a second electrode and a rubbing direction of an alignment film according to one embodiment of the present disclosure.

Hence, in this embodiment, the angle α between extension direction of the slits 3 and the rubbing direction of the alignment film 101 is set as $0°≤α≤12°$, as shown in FIGS. 3-5. However, when $0°<α<5°$, an alignment direction of the liquid crystal molecules (i.e., the rubbing direction of the alignment film 101) is substantially parallel to the slits 3 of the second electrode 2. When a driving voltage is applied, sometimes the confused deflection of the liquid crystal molecules will occur, which results in unsaturated brightness of a screen in the event of a very large driving voltage. When α is greater than 7°, there will be a very large angle between the alignment direction of the liquid crystal molecules and the slits 3 of the second electrode 2, which results in a very small deflection angle of the liquid crystal molecules. In order to prevent light leakage for the screen in a dark state, a direction of an absorption axis for a polarizer of a display panel has to be parallel to or perpendicular to the rubbing direction of the alignment film 101, which however results in a decreased light transmittance of the screen. Here, the angle α is preferably set as $5°≤α≤7°$, so as to ensure the response time, transmittance and contrast of the pixel structure in a better manner, thereby to ensure the display quality of the display device. To be specific, in order to ensure the angle range of α, because the angle β between the rubbing direction of the alignment film 101 and the longitudinal direction is increased, it is required to set α to be a difference between β and θ (the angle between the extension direction of the slits 3 and the longitudinal direction), i.e., $α=|θ-β|$, so as to ensure that α is not too large and falls within the mentioned angle range.

For the ADS display device capable of providing a two-domain liquid crystal operational mode, when designing the pixel structure of the array substrate, the slits 3 of the pixel electrode 2 will extend in two different directions, and preferably the extension directions of two adjacent slits 3 is in mirror symmetry with a normal direction (i.e., a broken line in FIG. 5) of the rubbing direction L, as shown in FIG. 5, so that the angles α between the extension directions of the slits 3 and the rubbing direction are identical to each other. As a result, the identical response time for the liquid crystal molecules will be obtained under the effect of the driving electric fields with the same intensity, and the display quality of the display device will be improved.

To be specific, the angle α between the slit 3 and the rubbing direction of the alignment film 101 is $2°≤α≤12°$ and the angle β is $2°≤β≤14°$, then it can be calculated that $0°≤θ≤12°$ according to an expression $2°≤α=β-θ≤12°$, and $4°≤θ≤26°$ according to an expression $2°≤α=θ-β≤12°$.

According to the present disclosure, the angle β at which the rubbing direction of the alignment film is offset from a direction perpendicular to the gate lines 10 is set as $β≥2°$, so as to effectively improve the poor rubbing of the alignment film. Further, for the ADS display device capable of providing the multi-domain liquid crystal operational mode, the angle α between the extension direction of the slits and the rubbing direction is set as $0°≤α≤12°$, so as to ensure the display quality of the display device while improving the poor rubbing.

Further, the extension direction of the data lines 20 is set as parallel to the rubbing direction of the alignment film 101, so as to obtain the angle between the extension direction of the data lines 20 and the extension direction of the slits 3 equal to α, thereby to effectively increase an aperture rate of the pixel units 1.

The relationship among the angle α between the extension direction of the slits and the rubbing direction, the angle β between the rubbing direction of the alignment film and the longitudinal direction, and the angle θ between the slits and the longitudinal direction will be described hereinafter in conjunction with several modes.

In a first mode, the extension direction of the data lines 20 is set as parallel to the rubbing direction of the alignment film 101, the angle β between the rubbing direction of the alignment film 101 and the longitudinal direction is $β=14°$, and the angle α between the slits 3 and the rubbing direction of the alignment film is $2°≤α≤12°$. When $α=β-θ$, it can be calculated that $2°≤θ≤12°$, and when $α=θ-β$, it can be calculated that $16°≤θ≤26°$.

In a second mode, the angle β between the rubbing direction of the alignment film and the longitudinal direction is $β=7°$, and the angle α between the slits 3 and the rubbing direction of the alignment film is $2°≤α≤12°$. When $α=β-θ$, it can be calculated that $0°≤θ≤5°$, and when $α=θ-β$, it can be calculated that $9°≤θ≤19°$.

In a third mode, the angle β between the rubbing direction of the alignment film and the longitudinal direction is $β=2°$, and the angle α between the slits 3 and the rubbing direction of the alignment film is $2°≤α≤12°$. When $α=β-θ$, it can be calculated that $θ=0°$, and when $α=θ-β$, it can be calculated that $4°≤θ≤14°$.

In a fourth mode, the angle α between the slits 3 and the rubbing direction of the alignment film is $α=7°$, and the angle β between the rubbing direction of the alignment film and the longitudinal direction is $2°≤β≤14°$. When $α=β-θ$, it can be calculated that $0°≤θ≤7°$, and when $α=θ-β$, it can be calculated that $9°≤θ≤21°$.

In a fifth mode, the angle α between the slits 3 and the rubbing direction of the alignment film is $α=5°$, and the angle β between the rubbing direction of the alignment film and the longitudinal direction is $2°≤β≤14°$. When $α=β-θ$, it can be calculated that $0°≤θ≤9°$, and when $α=θ-β$, it can be calculated that $7°≤θ≤19°$.

Third Embodiment

Based on an identical inventive concept, the present disclosure provides in this embodiment a liquid crystal display device including the array substrate according to the first embodiment. Because the rubbing direction of the alignment film is not perpendicular to the gate line direction, it is able to reduce the resistance occurring when the alignment film is subject to the rubbing alignment and reduce the poor rubbing, thereby to improve a yield of the liquid crystal device.

Alternatively, the angle β at which the rubbing direction of the alignment film is offset from a direction perpendicular to the gate lines is set as $β≥2°$, so as to effectively improve the poor rubbing of the alignment film. Further, for the ADS display device capable of providing the multi-domain liquid crystal operational mode, the angle α between the extension direction of the slits and the rubbing direction is set as $0°≤α≤12°$, so as to ensure the display quality of the display device while improving the poor rubbing.

The above are merely the preferred embodiments of the present disclosure. It should be appreciated that, a person skilled in the art may make further improvements and substitutions without departing from the principle of the present disclosure, and these improvements and substitutions shall also fall within the scope of the present disclosure.

What is claimed is:

1. An array substrate, comprising gate lines, data lines, pixel units defined by the gate lines and the data lines, and an alignment film formed above the pixel units, wherein the gate lines extend in a horizontal direction, and a rubbing direction of the alignment film is angled relative to a longitudinal direction at a first non-zero angle $\beta$, wherein the data lines extend in a direction substantially parallel to the rubbing direction of the alignment film.

2. The array substrate according to claim 1, wherein $\beta \geq 2°$.

3. The array substrate according to claim 2, wherein $2° \leq \beta \leq 14°$.

4. The array substrate according to claim 3, wherein $\beta=7°$.

5. The array substrate according to claim 1, wherein each of the pixel units comprises a first electrode, and a second electrode provided with a plurality of slits and arranged above the first electrode, and the slits extend in several different directions.

6. The array substrate according to claim 5, wherein each of the slits extends in a direction angled relative to the rubbing direction at a second angle $\alpha$, and $0° \leq \alpha \leq 12°$.

7. The array substrate according to claim 6, wherein $5° \leq \alpha \leq 7°$.

8. The array substrate according to claim 6, wherein the slits extend in two different directions, and two adjacent slits extend in directions in mirror symmetry with respect to a normal direction of the rubbing direction.

9. A liquid crystal display device comprising an array substrate, wherein the array substrate comprises gate lines, data lines, pixel units defined by the gate lines and the data lines, and an alignment film formed above the pixel units, wherein the gate lines extend in a horizontal direction, and a rubbing direction of the alignment film is angled relative to a longitudinal direction at a first non-zero angle $\beta$, wherein the data lines extend in a direction substantially parallel to the rubbing direction of the alignment film.

10. The array substrate according to claim 7, wherein the slits extend in two different directions, and two adjacent slits extend in directions in mirror symmetry with respect to a normal direction of the rubbing direction.

11. The liquid crystal display device according to claim 10, wherein $\beta \geq 2°$.

12. The liquid crystal display device according to claim 11, wherein $2° \leq \beta \leq 14°$.

13. The liquid crystal display device according to claim 12, wherein $\beta=7°$.

14. The liquid crystal display device according to claim 10, wherein each of the pixel units comprises a first electrode, and a second electrode provided with a plurality of slits and arranged above the first electrode, and the slits extend in several different directions.

15. The liquid crystal display device according to claim 14, wherein each of the slits extends in a direction angled relative to the rubbing direction at a second angle $\alpha$, and $0° \leq \alpha \leq 12°$.

16. The liquid crystal display device according to claim 15, wherein $5° \leq \alpha \leq 7°$.

17. The liquid crystal display device according to claim 15, wherein the slits extend in two different directions, and two adjacent slits extend in directions in mirror symmetry with respect to a normal direction of the rubbing direction.

18. The liquid crystal display device according to claim 16, wherein the slits extend in two different directions, and two adjacent slits extend in directions in mirror symmetry with respect to a normal direction of the rubbing direction.

* * * * *